July 25, 1944.　　　　　L. LOWY　　　　　2,354,390
PUSH LOCK FOR BATHROOM SCALES
Filed May 10, 1943　　　2 Sheets-Sheet 1
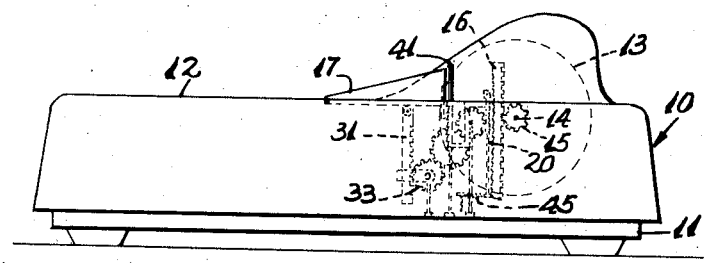
Fig. 1.
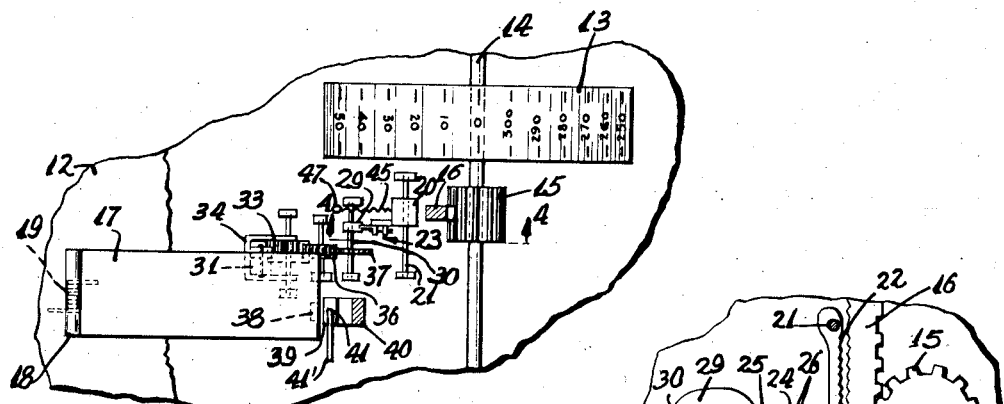
Fig. 3.
Fig. 4.
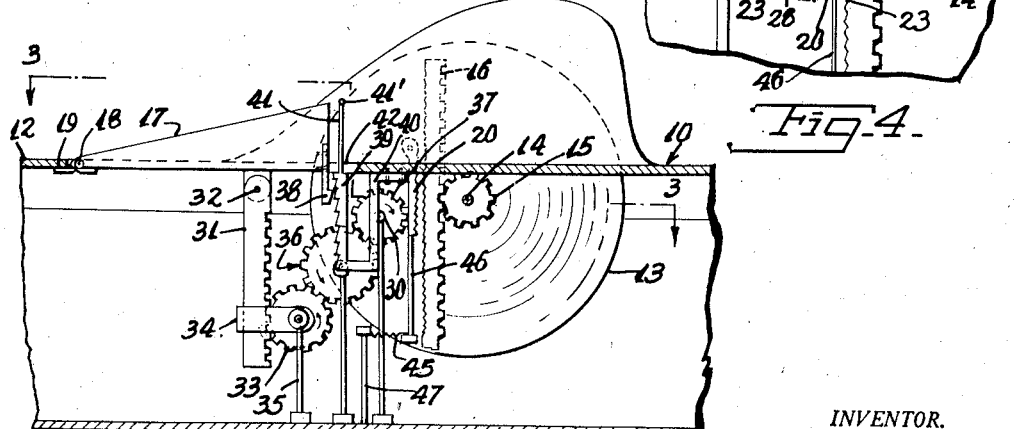
Fig. 2.
INVENTOR.
Larry Lowy
BY
Zoltan F. Polacheck
ATTORNEY

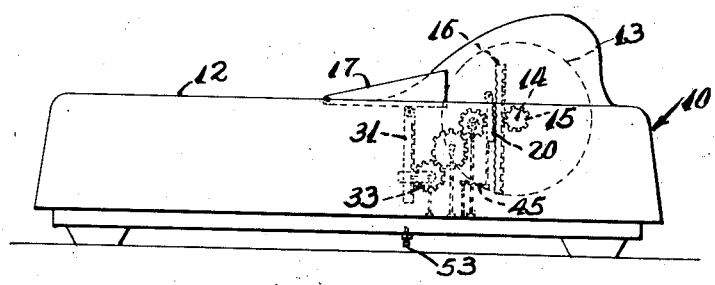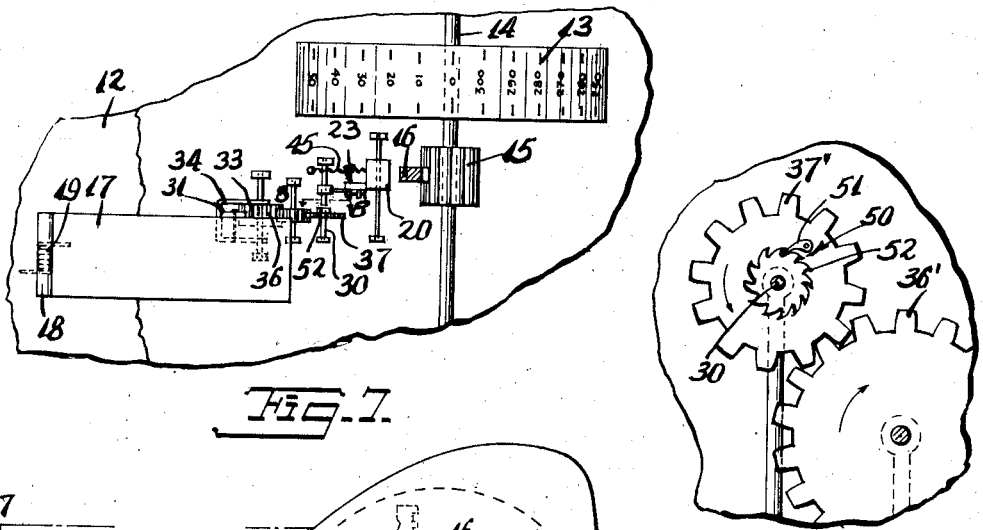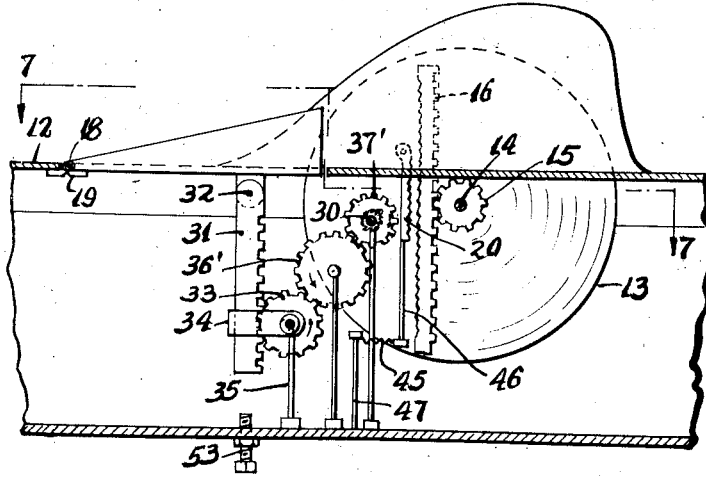

Patented July 25, 1944

2,354,390

UNITED STATES PATENT OFFICE 2,354,390

PUSH LOCK FOR BATHROOM SCALES

Larry Lowy, Rockaway Park, N. Y.

Application May 10, 1943, Serial No. 486,405

11 Claims. (Cl. 265—68)

This invention relates to new and useful improvements in household scales, and has more particular reference to push locks for holding and releasing the weight indicators of such scales.

More particularly, the invention relates only to those types of household scales having a weight platform and a weight indicator near the floor. Many people when standing on the weight platform find the weight indicator too far away for reading or accurate reading. For this reason it is proposed that the new push lock be provided so that a person may lock the weight indicator in indicated position and then step off the scale and bend down to see the reading. Thereafter, the push lock may be released and the scale is ready for a new weighing.

More particularly, the invention contemplates the provision of a depressible member mounted on the weight platform and an associated mechanism which will lock the weight indicator when the depressible member is pressed down.

A latch device is proposed for holding the depressible member in its depressed position. Means is also proposed for releasing the said latch.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a household scale with a push lock constructed in accordance with this invention.

Fig. 2 is a fragmentary enlarged detailed view of a portion of Fig. 1 with certain parts broken away to disclose the interior construction.

Fig. 3 is a fragmentary horizontal sectional view taken on the line 3—3 of Fig. 2.

Fig. 4 is a fragmentary enlarged sectional view taken on the line 4—4 of Fig. 3.

Fig. 5 is a side elevational view of a household scale with a push lock constructed in accordance with another embodiment of this invention.

Fig. 6 is a fragmentary enlarged detailed view of a portion of Fig. 5 with certain parts broken away to disclose interior construction.

Fig. 7 is a fragmentary horizontal sectional view taken on the line 7—7 of Fig. 6.

Fig. 8 is a fragmentary enlarged vertical sectional view taken on the line 8—8 of Fig. 7.

The new push lock for household scale reading, in accordance with this invention, is used in combination with a household scale 10 of any design and construction having a housing 11, a weight platform 12, and a weight indicator 13 all of which are near the floor. The particular details of the scale itself will not be given in this specification as they form no part of the invention and scales of this type are generally known.

Preferably, the weight indicator 13 is mounted on a spindle 14 which is provided with a small gear 15 engaged by a rack 16 for operating the weight indicator. Scales of this particular type may be seen in the U. S. patent to Walker, No. 2,073,912.

A depressible member 17 is pivotally mounted on the platform 12 by a pintle 18. A spring 19 is coaxially mounted on the pintle 18 and acts between the depressible member 17 and the platform 12 for normally urging the depressible member upwards. This depressible member is of a design so that it may easily be pressed downwards with one's big toe, or foot during the weighing operation without vibrating the weight platform 12.

A friction lever 20 is located adjacent the rack 16 and is adapted to grip and lock the rack. This friction lever is pivotally supported at its top end by a pintle 21. It has a roughened edge 22 which is engageable with a roughened edge 23 formed on the back of the rack 16. The lever 20 is located at an elevation directly behind the gear 15. An arm 23 is mounted on and projects from the lever 20.

The arm 23 is formed from a section 24 mounted on the lever 20 and an extendable outer section 25. Several screws 26 are rotatively mounted on a bracket 27 on the fixed section 24 and threadedly engage a flange 28 on the extendable section 25. A cam 29 is cooperative with this arm 23 for moving the lever 20. This cam 29 is mounted on a spindle 30. The extendable section 25 may be adjusted so that the friction lever 20 properly locks the rack 16.

There is a transmission from the depressible member 17 to the cam 29. This transmission includes a rack 31 pivotally mounted by a pintle 32 upon the bottom of the depressible member 17. The rack 31 meshes with a gear 33. A strap 34 maintains the rack 31 in mesh with said gear. The gear 33 is rotatively supported in a standard 35. The gear 33 is one of a train of gears 36 which includes a gear 37 on the shaft 30 which supports the cam 29.

A latch is provided for holding the depressible member 17 in a depressed condition. This latch comprises a ratchet like hook 38 mounted on the depressible member 17 and cooperative with a toothed bar 39. This toothed bar 39 is a portion of a bracket 40 mounted upon the bottom of the weight platform 12.

Means is provided for releasing the latch of the depressible member 17 and includes a rod 41 projecting from the toothed bar 39 and extending into and through a slot 42 in the weight platform 12. The upper end 41' of the rod 41 is bent laterally, as clearly shown in Fig. 3. A spring 45 is connected with a pin 46 mounted on the friction lever 20 and with another pin 47 mounted on the housing 11 of the scale, and functions to normally urge the friction lever 20 into its free position.

The operation of the device is as follows:

When a person stands on the weight platform 12, the household scale 10 functions and the weight indicator 13 gives the weight. While the person is still standing on the platform 12 he depresses the depressible member 17. This member is then held depressed, since the ratchet-like hook 38 merely slides down the toothed rod 39 engaging the teeth thereof.

When the depressible member 17 is pressed downwards the transmission 36 will rotate the shaft 30 which turns the cam 29 which in turn acts against the arm 23 of the lever 20 to force the lever 20 against the rack 16. This locks the weight indicator 13 of the household scale. The person may now step off the platform 12 and bend down to read the weight indicator 13.

The weight indicator 13 is released by kicking or moving the bent end 41' of the rod 41 so as to free the toothed bar 39 from the ratchet-like hook 38. This frees the depressible member 17 and the spring 19 returns it to its raised position. The transmission 36 is thus moved back to its original position. This indirectly moves the cam 29 which indirectly frees the friction lever 20.

In the modified form of the invention illustrated in Figs. 5–8 inclusive, the new push lock household scale distinguishes from the prior form in the construction and operation of the means controlled by the depressible member 17 for operating the said cam 29. This means is characterized by a transmission 36' in the nature of a train of gears which includes a one way ratchet 50. More particularly, this ratchet 50 comprises a pawl 51 mounted on the side of the gear 37' which is loose on the shaft 30 and cooperative with a ratchet wheel 52 fixedly mounted on the shaft 30. In other respects this transmission is substantially identical to the one disclosed in the prior form of the invention and like parts have been given like reference numerals.

It is furthermore pointed out that in this modified form of the invention the depressible member 17 is not associated with any latching and holding means. Instead, it is associated with a limiting means by which the stroke of the transmission may be controlled. This limiting means is in the nature of a stop screw 53 adjustably mounted on the housing 11 and forming a stop for the downward motion of the rack 31. It is pointed out that the cam 29 is designed to turn through segments of 180° to move from an operating to an inoperative position and then back again to an operating position. The adjustment screw 53 may be so adjusted that on each full depression of the depressible member 17 the transmission 36' turns the cam 29 180°.

In other respects this form of the invention is similar to that previously described and like reference numerals identify like parts in each of the several views.

The operation of this form of the invention is as follows:

A person stands on the platform 12 and waits an instant until the weight indicator 13 reaches its weight indicating position. Then with the foot, the depressible member 17 is pressed downwards so as to cause the transmission 36' to rotate the cam 29 to its operative position. In this latter position the cam 29 indirectly moved the friction lever 20 into engagement with the rack 16 locking the rack 16 in a fixed position and so indirectly locking the weight indicator 13 in a fixed position. When the member 17 is released it returns to its raised position, but the cam 29 is not moved because the one way ratchet 50 now idles. The person may now step off the scale and bend down and read the weight indicator. The weight indicator may be released by again pressing the depressible member 17 down to its full depth, which again operated the transmission 36' which indirectly turns the cam 29 in the same direction for 180° to its inoperative position. This causes the friction lever 20 to move free from the rack 16. The scale is then free to return to its starting position.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a household scale having a housing and weight platform and weight indicator near the floor, a depressible member on said platform, a rack for controlling said weight indicator, a friction lever for gripping and locking said rack, an arm on said friction lever, a cam cooperative with said arm for moving said friction lever, a transmission from said depressible member to said cam, a latch for holding said depressible member in a depressed position, and means for releasing said latch.

2. In combination with a household scale having a housing and weight platform and weight indicator near the floor, a depressible member on said platform, a rack for controlling said weight indicator, a friction lever for gripping and locking said rack, an arm on said friction lever, a cam cooperative with said arm for moving said friction lever, a transmission from said depressible member to said cam, a latch for holding said depressible member in a depressed position, and means for releasing said latch, said depressible member being pivotally mounted on said platform, and resilient means urging it to its raised position.

3. In combination with a household scale having a housing and weight platform and weight indicator near the floor, a depressible member on said platform, a rack for controlling said weight indicator, a friction lever for gripping and locking said rack, an arm on said friction lever, a cam cooperative with said arm for moving said friction lever, a transmission from said depressible member to said cam, a latch for holding said depressible member in a depressed position, and means for releasing said latch, said friction lever having a roughened side engageable with a complementary roughened side on said rack.

4. In combination with a household scale having a housing and weight platform and weight indicator near the floor, a depressible member on said platform, a rack for controlling said weight indicator, a friction lever for gripping and locking said rack, an arm on said friction lever, a cam cooperative with said arm for moving said friction lever, a transmission from said depressible member to said cam, a latch for holding said depressible member in a depressed position, and means for releasing said latch, said arm comprising a pair of sections, and means for adjustably connecting these sections for controlling the length of the arm.

5. In combination with a household scale having a housing and weight platform and weight indicator near the floor, a depressible member on said platform, a rack for controlling said weight indicator, a friction lever for gripping and locking said rack, an arm on said friction lever, a cam cooperative with said arm for moving said friction lever, a transmission from said depressible member to said cam, a latch for holding said depressible member in a depressed position, and means for releasing said latch, said cam being mounted on a spindle, and said transmission being connected with said spindle.

6. In combination with a household scale having a housing and weight platform and weight indicator near the floor, a depressible member on said platform, a rack for controlling said weight indicator, a friction lever for gripping and locking said rack, an arm on said friction lever, a cam cooperative with said arm for moving said friction lever, a transmission from said depressible member to said cam, a latch for holding said depressible member in a depressed position, and means for releasing said latch, said transmission including a rack pivotally connected with said depressible member, and meshing with a gear of a gear train terminating in a spindle operating said cam.

7. In combination with a household scale having a housing and weight platform and weight indicator near the floor, a depressible member on said platform, a rack for controlling said weight indicator, a friction lever for gripping and locking said rack, an arm on said friction lever, a cam cooperative with said arm for moving said friction lever, a transmission from said depressible member to said cam, a latch for holding said depressible member in a depressed position, and means for releasing said latch, said latch comprising a latch bolt mounted on the depressible member and engageable with ratchet teeth on the arm of a bracket.

8. In combination with a household scale having a housing and weight platform and weight indicator near the floor, a depressible member on said platform, a rack for controlling said weight indicator, a friction lever for gripping and locking said rack, an arm on said friction lever, a cam cooperative with said arm for moving said friction lever, a transmission from said depressible member to said cam, a latch for holding said depressible member in a depressed position, and means for releasing said latch, said latch comprising a latch bolt mounted on the depressible member and engageable with ratchet teeth on the arm of a bracket, said latter-named arm being slightly flexible, a rod connected with said latter-named arm and extending through an opening in said weight platform and adapted to be moved and comprising the means for releasing said latch.

9. In combination with a household scale having a housing and weight platform and weight indicator near the floor, a depressible member on said platform, a rack for controlling said weight indicator, a friction lever for gripping and locking said rack, an arm on said friction lever, a cam cooperative with said arm for moving said friction lever, and means controlled by said depressible member for operating said cam.

10. In combination with a household scale having a housing and weight platform and weight indicator near the floor, a depressible member on said platform, a rack for controlling said weight indicator, a friction lever for gripping and locking said rack, an arm on said friction lever, a cam cooperative with said arm for moving said friction lever, and means controlled by said depressible member for operating said cam, comprising a transmission from said depressible member to said cam, a latch for holding said depressible member in a depressed position, and means for releasing said latch.

11. In combination with a household scale having a housing and weight platform and weight indicator near the floor, a depressible member on said platform, a rack for controlling said weight indicator, a friction lever for gripping and locking said rack, an arm on said friction lever, a cam cooperative with said arm for moving said friction lever, and means controlled by said depressible member for operating said cam, comprising a transmission including a one way ratchet, between said depressible member and said cam and means for limiting the amount said depressible member may be depressed so that the cam is turned from an inoperative to an operative position and back to an inoperative position for each two successive depressions of the depressible member.

LARRY LOWY.